No. 766,240. PATENTED AUG. 2, 1904.
D. GLENCROSS.
HIDE WORKING MACHINE.
APPLICATION FILED JAN. 8, 1904.
NO MODEL. 3 SHEETS—SHEET 1.

Witnesses:
Edw. C. Cleveland
Edwin P. Luce

Inventor:
Donald Glencross;
by Walter E. Lombard,
Atty.

No. 766,240. PATENTED AUG. 2, 1904.
D. GLENCROSS.
HIDE WORKING MACHINE.
APPLICATION FILED JAN. 8, 1904.
NO MODEL. 3 SHEETS—SHEET 2.

Witnesses:
Edna C. Cleveland
Edwin R. Luce

Inventor:
Donald Glencross,
by Walter E. Lombard
Atty.

No. 766,240. PATENTED AUG. 2, 1904.
D. GLENCROSS.
HIDE WORKING MACHINE.
APPLICATION FILED JAN. 8, 1904.
NO MODEL. 3 SHEETS—SHEET 3.
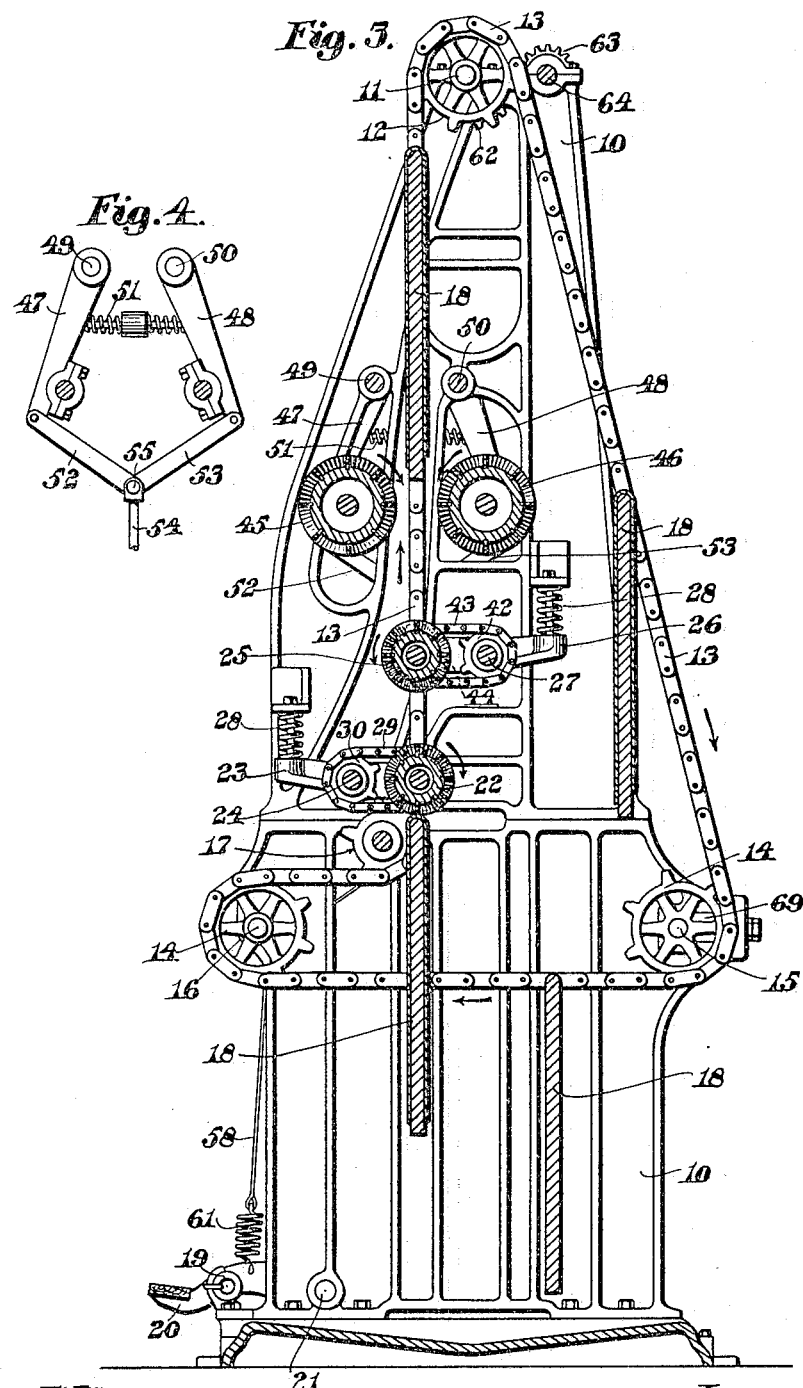
Witnesses:
Edna C. Cleveland
Edwin P. Luce
Inventor:
Donald Glencross,
by Walter E. Lombard,
Atty.

No. 766,240. Patented August 2, 1904.

UNITED STATES PATENT OFFICE.

DONALD GLENCROSS, OF PEABODY, MASSACHUSETTS.

HIDE-WORKING MACHINE.

SPECIFICATION forming part of Letters Patent No. 766,240, dated August 2, 1904.

Application filed January 8, 1904. Serial No. 188,249. (No model.)

*To all whom it may concern:*

Be it known that I, DONALD GLENCROSS, a subject of the King of Great Britain, and a resident of Peabody, in the county of Essex and State of Massachusetts, have invented certain new and useful Improvements in Hide-Working Machines, of which the following is a specification.

This invention relates to hide-working machines, and particularly to that class known as "putting-out" machines.

It has for its object the production of a machine in which the pressure of the working cylinders upon the hides being operated upon may be readily regulated by the operator to increase or decrease the pressure at will.

It has for a further object the provision of a means of deflecting the hide-supports toward the operator into a position where the hides may be more readily placed thereon than is possible in machines now in general use.

It consists in certain novel features of construction and arrangement of parts, which will be readily understood by reference to the description of the drawings and to the claims, to be hereinafter given.

Figure 1:
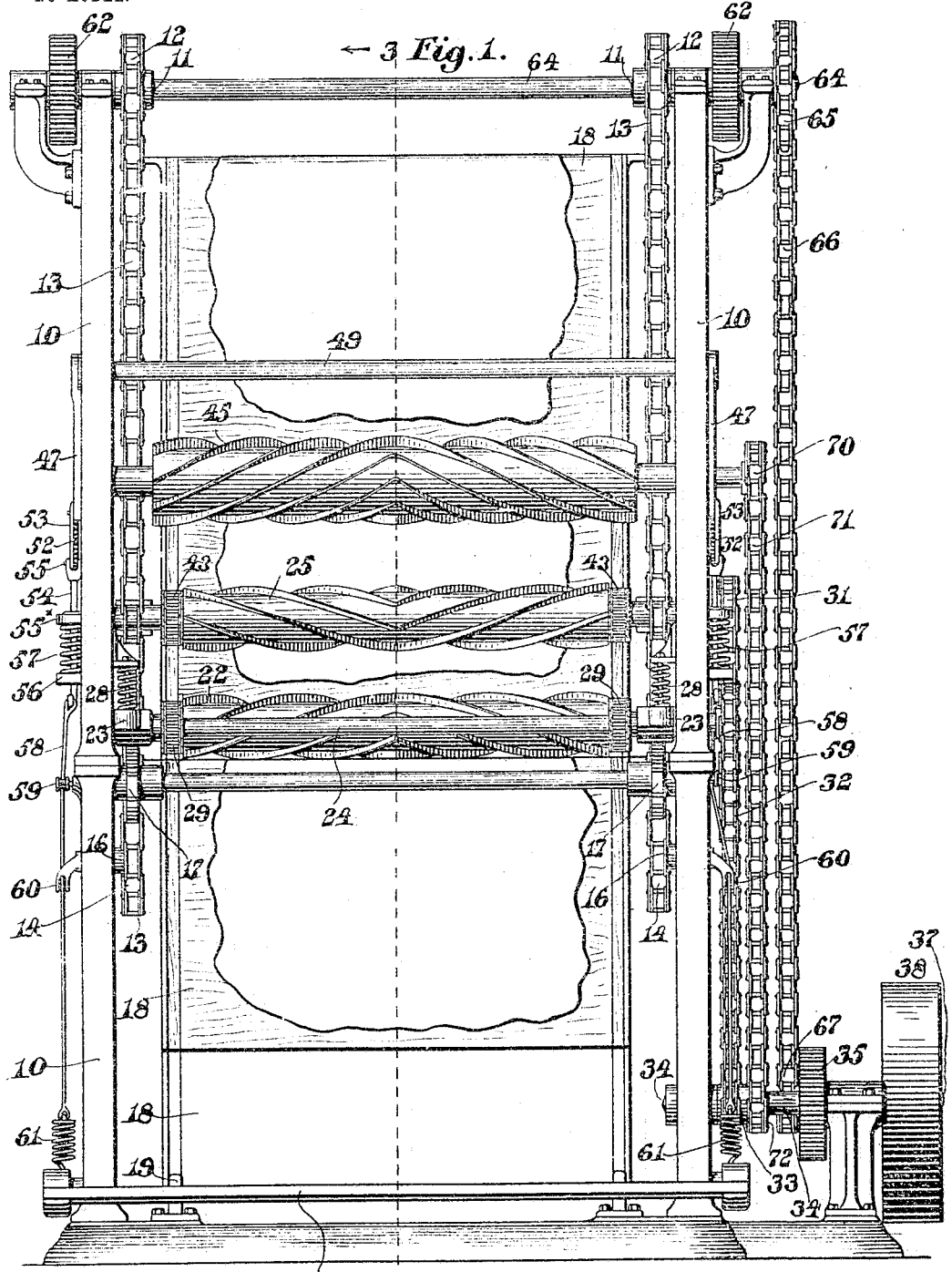
Figure 2:
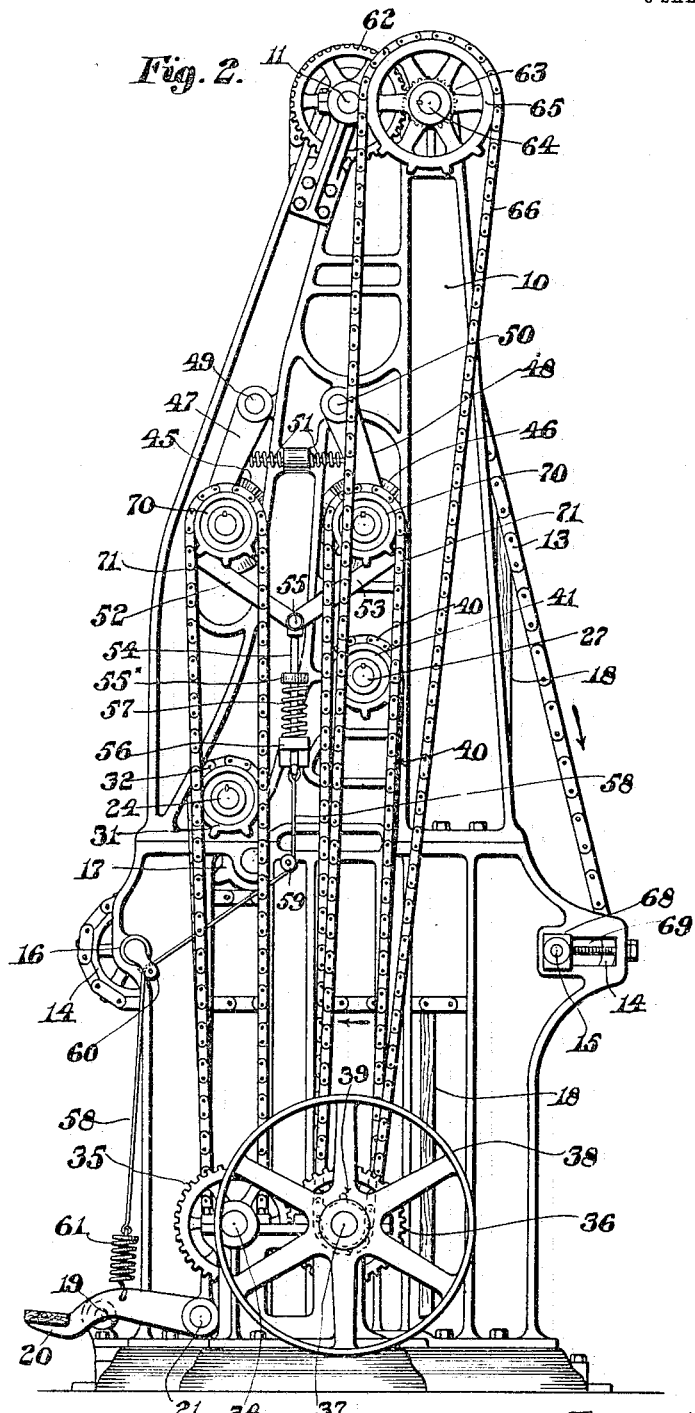

Of the drawings, Figure 1 represents a front elevation of a machine embodying this invention. Fig. 2 represents a right-hand end elevation of the same. Fig. 3 represents a transverse sectional elevation of the same looking toward the left of Fig. 1, and Fig. 4 represents a detail of the working-cylinder supports and the links for operating the same.

Similar characters designate like parts throughout the several figures of the drawings.

In the drawings, 10 represents the side frames of a machine embodying this invention, in which are mounted at the upper end thereof short shafts or trunnions 11, on each of which is secured a sprocket-wheel 12 inside of the frames 10. Each sprocket-wheel 12 supports an endless chain 13, passing around sprocket-wheels 14, mounted on trunnions 15 and 16 in the lower end of the frames 10. At the front of the machine the chain 13 extends downwardly from the sprocket-wheel 12 in a vertical direction to and around an idler sprocket-wheel 17 and thence toward the front of the machine around the sprocket-wheel 14 on the trunnion 16, which is located well to the front of the machine.

At various intervals the chains 13 have pivoted thereto hide-supports 18, extending from one chain to the other, and the upper or pivoted ends of said supports are rounded over to afford a suitable surface upon which to operate upon the center of the hides resting thereon.

The chains 13 move in the direction indicated by the arrows on Figs. 2 and 3, and when the hide-supports 18 reach the extreme front of the machine they occupy a position convenient for the operator to place thereon a hide which it is desired to operate upon. As the hide-support 18 passes toward the front of the machine the lower end thereof comes in contact with a rubber buffer 19 to prevent its interfering with the foot of the operator or the treadle 20, pivoted at 21 to the frames 10.

The hide-supports 18 after reaching the extreme forward position are lifted slightly in passing around the axis of the trunnions 16 and then move a short distance to the rear and around the axis of the idler sprocket-wheels 17 and then in a vertical direction toward the sprocket-wheel 12. As these hide-supports, having passed around the axis of the idler sprocket-wheel 17, begin to move upward with a hide supported thereon they come first into contact with a working cylinder 22, mounted in the ends of an arm 23, pivoted at 24, and then come into contact with a second hide-working cylinder 25, mounted in a similar manner to corresponding arms 26, pivoted at 27 on the opposite side of the path of the hide-supports 18.

The arms 23 and 26 when in their normal position rest against a spring-buffer 28, being held in contact therewith by the weight of their hide-working cylinders. The hide-working cylinder 22 is connected by a belt or chain 29 to a sprocket-wheel 30, mounted on the shaft 24, which also has secured thereon a sprocket-wheel 31, connected by a link belt 32 to a sprocket-wheel 33 on the shaft 34. The shaft 34 has secured thereto a gear 35, meshing with a gear 36 on the main driving-shaft 37, having secured thereto a driving-pulley 38, driven in any well-known manner.

The driving-shaft 37 has secured thereon a sprocket-wheel 39, which is connected by a belt 40 to a sprocket-wheel 41 on the shaft 27, which has also secured thereon a sprocket-wheel 42, connected by a short link belt 43 to a sprocket-wheel 44 on the shaft of the working cylinder 25. By means of this mechanism the working cylinders 22 and 25 are rotated at the desired speed in the direction indicated by the arrows, and as the hide-supports 18, elevated by the operation of the endless chain 13, come into contact with these hide-working cylinders and lift them and pass on and between them the revolution of the hide-working cylinders will operate upon that portion of the hide which rests upon the rounded ends of said hide-supports.

Immediately above the hide-working cylinders 22 and 25 are other working cylinders 45 and 46 on the opposite sides of the path of the hide-supports 18. The working cylinders 45 and 46 are mounted in levers 47 and 48, pivoted at 49 and 50 and normally held in separated position by springs 51. To the lower ends of the levers 47 48 are pivoted links 52 and 53, connected together and to a rod 54 at 55. The rod 54 has secured thereto a collar 55* and passes through a bracket 56, between which and the collar 55* is interposed a spring 57, operating to keep the pivot 55 normally in an elevated position.

The lower end of the rod 54 is connected by a cord 58, passing over pulleys 59 and 60 to a spring 61, secured to the treadle 20. As the hide on the support 18 passes upward to a position between the working cylinders 45 46 the operator presses down upon the treadle 20 and brings said working cylinders into contact with the hide, and by a greater or less depression of said treadle the pressure of said working cylinders upon said hide during the operation may be regulated to a nicety, as is obvious. Any inequalities in the hide as the working cylinders are operating thereon will be taken care of by the spring 61, which allows the working cylinders 45 and 46 to yield slightly to pass over such places. Each trunnion 11 has secured thereto a gear 62, meshing with a pinion 63 on a shaft 64, mounted in bearings inside the frames 10 and having secured thereon a sprocket-wheel 65, operated by a link belt 66, driven by a sprocket-wheel 67 on the driving-shaft 37.

The trunnion 15 is mounted in bearings 68, adjustably mounted in guideways 69 for the purpose of taking up the slack on the chain 13. The working cylinders 45 46 are driven by sprocket-wheels 70, connected by link belts 71 to sprocket-wheels 72 on the driving-shafts 34 and 37. This makes a very convenient form of putting-out machine, as it does away with the necessity of expensive gears, which in hide-working machinery are objectionable, as they are liable to get clogged with the refuse from the hides, which prevents the machine from operating satisfactorily. By means of the sprocket-wheels and the link belt, as shown in the drawings, this objection is entirely obviated, and there is no part which can become clogged and interfere with the proper working of the machine.

On delicate hides it is desirable that the pressure of the working cylinders may be at all times under the control of the operator, and this is accomplished by the devices shown.

Another great advantage of this machine is the means for deflecting the hide-supports toward the operator to facilitate the placing thereon of the hides to be manipulated upon. The present construction permits of two men handling the hides without interfering with each other, as is often the case, one man operating the treadle and placing the hides upon the hide-supports, while another man is stationed at the rear of the machine and removes from the hide-supports the hides which have already been operated upon.

Having thus described my invention, I claim—

1. The combination of a pair of hide-working cylinders, supports therefor, a hide-support, means for moving said support between said cylinders, yielding means interposed between each support and a stationary part for moving each cylinder independently of the other from the path of said hide-support, and means controlled by the operator for moving said cylinders into position to coöperate with said hide-support.

2. The combination of a pair of hide-working cylinders, a hide-support, means for moving said hide-support between said cylinders, a spring coacting with a stationary part for moving each of said cylinders independently of the other from the path of said hide-support, and means controlled by the operator for moving said cylinders into position to coöperate with said hide-support.

3. The combination of a pair of hide-working cylinders, pivoted supports therefor, a hide-support, means for moving said hide-support between said cylinders, yielding means coacting with a stationary part for moving each of said cylinders independently of the other from the path of said hide-support, a treadle, and a connector between said treadle and said pivoted supports.

4. The combination of a pair of hide-working cylinders, pivoted supports therefor, a hide-support, means for moving said hide-support between said cylinders, yielding means coacting with a stationary part for moving each of said cylinders independently of the other from the path of said hide-support, a pair of links connecting said cylinder-supports, a treadle, and a connector between said treadle and said links.

5. The combination of a pair of hide-working cylinders, pivoted supports therefor, a hide-support, means for moving said hide-support between said cylinders, yielding means coacting with a stationary part for separating said cylinders, a pair of links connecting said cylinder-supports, a treadle, and a connector between said treadle and the connection between said links.

6. The combination of a pair of hide-working cylinders, pivoted supports therefor, a hide-support, means for moving said hide-support between said cylinders, yielding means coacting with a stationary part for separating said cylinders, a link connected to each of said cylinder-supports and to each other, and means secured to the connection between said links and controlled by the operator for actuating said links to move said cylinders into contact with said hide-support.

7. The combination of a pair of hide-working cylinders, pivoted supports therefor, a hide-support, means for moving said support between said cylinders, yielding means coacting with a stationary part for moving each of said cylinders independently of the other from the path of said hide-support, a link connected to each of said cylinder-supports and to each other, and means secured to the connection between said links and controlled by the operator for actuating said links to move said cylinders into contact with said hide-support.

8. The combination of a pair of hide-working cylinders, a hide-support, means for moving said support between said cylinders, yielding means coacting with a stationary part for separating said cylinders, means for revolving said cylinders, and means including a spring controlled by the operator for moving said cylinders into position to coöperate with said hide-support.

9. The combination of a pair of hide-working cylinders, a hide-support, means for moving said support between said cylinders, yielding means coacting with a stationary part for moving each of said cylinders independently of the other from the path of said hide-support, means for revolving said cylinders, and means including a spring controlled by the operator for moving said cylinders into position to coöperate with said hide-support.

10. The combination of a pair of endless belts, a plurality of hide-supports interposed between said belts and secured thereto, a working cylinder on either side of the path of said supports, yielding means interposed between each of said cylinders and a stationary part to move each of said working cylinders independently of the other from the path of said hide-supports, treadle mechanism for bringing said cylinders into position to coöperate with said supports, a main driving-shaft, a belt-driving shaft, a gear thereon, a pinion meshing therewith, a large sprocket-wheel keyed to said pinion, a small sprocket-wheel on the main driving-shaft, and a belt connecting said wheels.

11. The combination of a pair of endless belts, a plurality of hide-supports interposed between said belts and secured thereto, a working cylinder on either side of the path of said supports, yielding means interposed between said cylinders and a stationary part to move each of said cylinders independently of the other from the path of said hide-supports, means for bringing said cylinders into position to coöperate with said supports, a main driving-shaft, a belt-driving shaft, a gear thereon, a pinion meshing therewith, a large sprocket-wheel keyed to said pinion, a small sprocket-wheel on the main driving-shaft, a link belt connecting said sprocket-wheels, a shaft parallel to said main driving-shaft and geared thereto, and belts connecting said shafts and said working cylinders.

12. The combination of a pair of hide-working cylinders, pivot-supporting arms therefor, a hide-support, means for moving said hide-support between said cylinders, means for independently moving said cylinders out of the path of said hide-support, and means including a spring controlled by the operator for moving said cylinders into position to coöperate with said hide-support.

13. The combination of a pair of hide-working cylinders, a pair of endless belts, a plurality of hide-supports mounted thereon, means for moving said supports between said cylinders, yielding means coacting with a stationary part for separating said cylinders, means for revolving said cylinders, and means including a spring controlled by the operator for moving said cylinders into position to coöperate with said hide-supports.

Signed by me at Boston, Massachusetts, this 2d day of January, 1904.

DONALD GLENCROSS.

Witnesses:
WALTER E. LOMBARD,
EDNA C. CLEVELAND.